(12) United States Patent
Jette

(10) Patent No.: US 8,985,530 B2
(45) Date of Patent: Mar. 24, 2015

(54) CABLE MANAGEMENT SYSTEM

(76) Inventor: Roger Jette, West Islip, NY (US)

( * ) Notice: Subject to any disclaimer, the term of this patent is extended or adjusted under 35 U.S.C. 154(b) by 304 days.

(21) Appl. No.: 12/985,764

(22) Filed: Jan. 6, 2011

(65) Prior Publication Data

US 2012/0175470 A1     Jul. 12, 2012

(51) Int. Cl.
| F16L 3/08 | (2006.01) |
| H02G 3/04 | (2006.01) |
| F16L 3/00 | (2006.01) |
| E21F 17/02 | (2006.01) |
| F16L 3/22 | (2006.01) |

(52) U.S. Cl.
CPC .................................. H02G 3/0443 (2013.01)
USPC ................ 248/67.7; 248/49; 248/60; 248/65; 248/68.1

(58) Field of Classification Search
USPC .............. 248/49, 58, 60, 65, 68.1, 74.1, 74.2, 248/74.4, 220.43, 302; 211/26
See application file for complete search history.

(56) References Cited

U.S. PATENT DOCUMENTS

| 2,082,099 | A | | 6/1935 | Cruser |
| 3,023,692 | A | | 3/1962 | Crown |
| 3,082,984 | A | | 3/1963 | Larsson et al. |
| 4,023,758 | A | | 5/1977 | Yuda |
| 4,143,845 | A | * | 3/1979 | Harris ..................... 248/220.43 |
| 5,921,402 | A | * | 7/1999 | Magenheimer ................. 211/26 |
| 6,019,323 | A | * | 2/2000 | Jette ............................... 248/49 |
| 6,140,584 | A | | 10/2000 | Baldissara |
| 6,161,803 | A | | 12/2000 | Daoud |
| 6,361,000 | B1 | * | 3/2002 | Jette ............................... 248/49 |
| 6,364,255 | B1 | * | 4/2002 | Carrick et al. ................. 248/49 |
| 6,427,952 | B2 | | 8/2002 | Caveney et al. |
| 6,460,812 | B1 | * | 10/2002 | Jette ............................... 248/49 |
| 6,637,704 | B2 | | 10/2003 | Jette |
| 7,527,226 | B2 | | 5/2009 | Kusuda et al. |
| 8,177,172 | B2 | * | 5/2012 | Quertelet et al. ............ 248/68.1 |
| 2001/0007341 | A1 | | 7/2001 | Jette |
| 2002/0030143 | A1 | | 3/2002 | Jette |
| 2009/0283645 | A1 | * | 11/2009 | Nikayin ..................... 248/68.1 |

* cited by examiner

*Primary Examiner* — Jonathan Liu
*Assistant Examiner* — Taylor Morris
(74) *Attorney, Agent, or Firm* — Carter DeLuca Farrell & Schmidt LLP

(57) ABSTRACT

A cable support apparatus includes a flexible spine formed from a single piece of wire stock and a plurality of support members extending along a length of the flexible spine. Each of the support members is formed from a single piece of wire stock. The plurality of support members cooperate with one another to define a longitudinal passageway extending along a length of the flexible spine for retaining one or more cables therein. Each support member includes a body segment extending along and engaged to the flexible spine to define at least two attachment apertures therebetween.

16 Claims, 12 Drawing Sheets

CABLE MANAGEMENT SYSTEM

BACKGROUND

1. Technical Field

The present disclosure relates to cable management systems. More particularly, the present disclosure relates to a flexible cable management system for supporting and retaining one or more cables therein.

2. Description of Related Art

Due to the increasing usage of communication, data, and other cable-dependent systems, greater numbers of cables are required to interconnect the various systems with one another and with their various peripheral devices. As a result, various cable management systems have been developed to deal with the task of organizing and routing the numerous cables to their destinations. As can be appreciated, these cable management systems must be capable of securely retaining one or more cables therein and routing the cables around fixed obstacles, e.g., ductwork, walls, beams, fixtures, etc. Further, since different buildings define vastly different, and sometimes unique, configurations, it is desirable that these cable management systems be adaptable for use in various setting and/or configurations.

For example, commonly-owned U.S. Pat. Nos. 5,839,702, 6,019,323, and 6,361,000, the entire contents of each of which is hereby incorporated by reference herein, disclose flexible cable management systems which greatly simplified the installation, organization, routing and protection of cables. In general, these cable management systems are designed to bend into curves in either a lateral or a vertical direction to define a specific configuration particularly suited to navigate around any obstacle.

SUMMARY

In accordance with one embodiment of the present disclosure, a cable support apparatus is provided. The cable support apparatus includes a flexible spine and a plurality of support members disposed along a length of the flexible spine. The flexible spine and each of the support members are formed from a single piece of wire stock. The support members cooperate with one another to define a longitudinal passageway extending along a length of the flexible spine for retaining one or more cables therein. Each support member includes a body segment extending along and engaged to the flexible spine such that two or more attachment apertures are defined between each body segment and the flexible spine.

In one embodiment, the body segment of each support member is welded to the flexible spine in three or more positions to define the two or more attachment apertures therebetween.

In another embodiment, the body segment of each support member defines a generally sine-wave-shaped configuration. The flexible spine substantially bisects each of the sine-wave-shaped body segments and is engaged to each body segment at each intersection point of the respective body segment and the flexible spine. As a result of this configuration, as can be appreciated, two or more attachment apertures are defined between each body segment and the flexible spine.

In yet another embodiment, the flexible spine is engaged to the body segment of each support member on an interior side thereof. In other words, the flexible spine is disposed within the longitudinal passageway defined by the support members.

In still another embodiment, each support member further includes a first arm and a second arm. The first arm extends from a first end of the body segment and defines a generally rectangular-shaped configuration. The second arm extends from a second end of the body segment such that the first and second arms are longitudinally-spaced relative to one another and such that the first and second arms extend in a generally similar direction from the flexible spine.

The first arm may include a free end extending toward the body segment. More specifically, the free end of the first arm may be spaced-apart relative to the body segment to define an opening therebetween to permit positioning of one or more cables within the longitudinal passageway.

The second arm may include a free end extending away from the body segment. The free end of the second arm may be configured to extend past the free end of the first arm. Further, each of the first and second arms may include a finger disposed at the free ends thereof. The finger of the first arm may be deflected in a first direction and the finger of the second arm may be deflected in a second, opposite direction to facilitate positioning of one or more cables within the longitudinal passageway.

In another embodiment, the free end of the first arm, the free end of the second arm, and the first and second fingers are substantially co-planar with one another.

In still yet another embodiment, two (or more) of the attachment apertures are offset relative to one another. More specifically, the two (or more) offset attachment apertures may be disposed on opposite sides of the flexible spine, e.g., above and below the flexible spine.

Another embodiment of a cable support apparatus is provided in accordance with the present disclosure. In this embodiment, the cable support apparatus includes a flexible spine formed from a single piece of wire stock and a plurality of support members disposed along a length of the flexible spine, each of which is also formed from a single piece of wire stock. Each support member further includes a multi-curved body segment and a pair of arms extending therefrom to define a longitudinal passageway configured to retain one or more cables therein. The flexible spine is positioned relative to each of the support members such that the flexible spine substantially bisects the multi-curved body segment of each of the support members to define three or more intersection points between each of the support members and the flexible spine. Each support member is welded to the flexible spine at each of the intersection points therebetween to define two or more attachment apertures between each of the support members and the flexible spine.

In one embodiment, the multi-curved body segment of each support member defines a generally sine-wave-shaped configuration.

In another embodiment, the flexible spine is welded to the support member on an internal side thereof such that the flexible spine is disposed within the longitudinal passageway.

In yet another embodiment, the flexible spine is positioned relative to each support member such that two or more of the attachment apertures of each support member are offset relative to one another. Further, the offset attachment apertures may be disposed on opposite sides of the flexible spine, e.g., above and below the flexible spine.

In accordance with still another embodiment of the present disclosure, a cable support apparatus is provided. The cable support apparatus of this embodiment includes a flexible spine formed from a single piece of wire stock and a plurality of support members positioned along a length of the flexible spine. Each of the support members is likewise formed from a single piece of wire stock. The support members cooperate with one another to define a longitudinal passageway extending along a length of the flexible spine for retaining one or more cables therein. More specifically, each support member includes a body segment, a first arm, and a second arm. The body segment of each support member extends along the flexible spine and is engaged to the flexible spine. The first arm of each support member extends from a first end of the body segment and defines a generally rectangular-shaped configuration. The first arm further includes a free end extending toward the body segment and being spaced-apart relative to the body segment to define an opening therebetween for positioning one or more cables within the longitudinal passageway. The second arm of each support member defines a generally linear configuration and extends from a second end of the body segment that is longitudinally-spaced from the first end of the body segment. The second arm defines a plane that is disposed in generally parallel orientation with respect a plane defined by the first arm. The second arm further includes a free end extending away from the flexible spine. The free end of the second arm extends past the free end of the first arm.

In one embodiment, the body segment of each support member is engaged to the flexible spine to define two or more attachment apertures therebetween. More specifically, the body segment of each support member may be welded to the flexible spine in three or more positions to define the two or more attachment apertures therebetween.

In another embodiment, the body segment of each support member defines a multi-curved configuration. In such an embodiment, the flexible spine is positioned to substantially bisect each body segment and is engaged to each body segment at the intersection points therebetween to define the two or more attachment apertures between each of the support members and the flexible spine.

In yet another embodiment, the flexible spine is engaged to the body segment of each support member on an interior side thereof, such that the flexible spine is disposed within the longitudinal passageway.

In still another embodiment, two or more of the attachment apertures are offset relative to one another, the offset attachment apertures being disposed on opposite sides of the flexible spine.

In still yet another embodiment, the first arm includes a first finger disposed at the free end thereof and the second arm includes a second figure disposed at the free end thereof. The first and second fingers are deflected relative to the first and second arms, respectively, in opposite directions relative to one another to facilitate positioning of one or more cables within the longitudinal passageway.

A method of installing a cable support apparatus is also provided in accordance with the present disclosure. The method includes providing a cable support apparatus according to any of the embodiments discussed above. The method further includes bending the flexible spine to a selected configuration and securing the cable support apparatus to a frame via at least one of the attachment apertures.

In one embodiment, the method further includes positioning one or more cables within the longitudinal passageway. More specifically, the cables are manipulated between the first and second arms of each of the support members and through an opening defined between the first arm and the body segment of each support member in order to position the one or more cables within the longitudinal passageway.

In another embodiment, a screw, bolt, or other securing member, is inserted through at least one of the attachment apertures to secure the cable support apparatus to the frame.

In still another embodiment, the flexible spine is bent in a plurality of positions to achieve the selected configuration.

BRIEF DESCRIPTION OF THE DRAWINGS

Various illustrative embodiments of the present disclosure are described herein with reference to the drawings, wherein.

DETAILED DESCRIPTION

Figure 1:
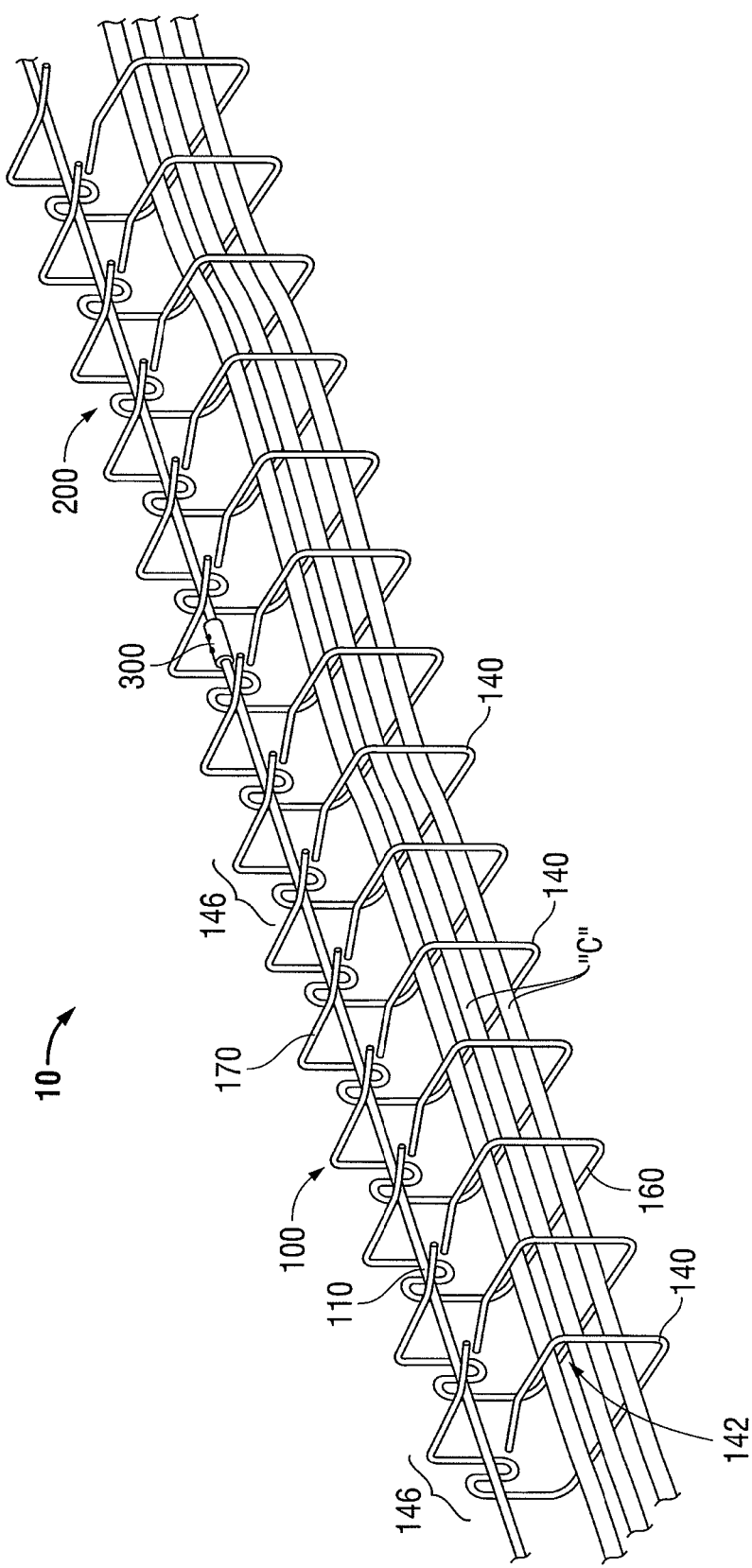
FIG. 1 is a perspective view of one embodiment of a cable support system in accordance with the present disclosure.

Illustrative embodiments of the present disclosure are described in detail with reference to the drawing figures wherein like reference numerals identify similar or identical elements.

Figure 2:
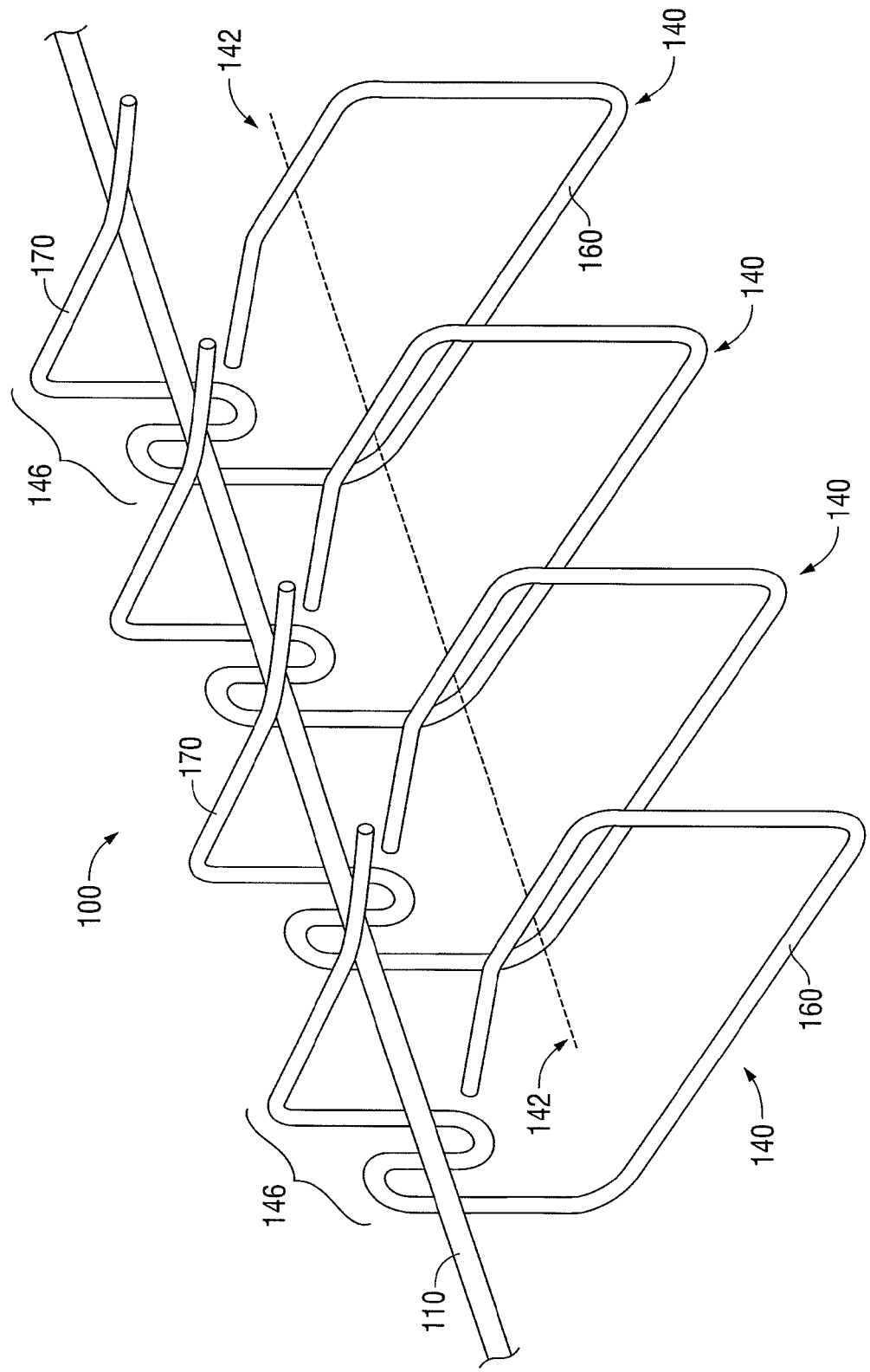
FIG. 2 is an enlarged, perspective view of a portion of one of the cable support apparatuses of the cable support system of FIG. 1.

Turning now to FIGS. 1-2, one illustrative embodiment of a cable support system in accordance with the present disclosure is shown generally identified by reference numeral 10. Cable support system 10 includes one or more cable support apparatuses 100, 200 coupled to one another in an end-to-end relation therewith. Cable support apparatuses 100, 200 are substantially similar to one another and, thus, only cable support apparatus 100 will be described herein to avoid unnecessary repetition. Each cable support apparatus 100 includes a flexible spine 110 formed from a single piece of wire stock, e.g. stainless steel wire, and a plurality of support members 140 engaged to and extending from flexible spine 110. Each support member 140 is also formed from a single piece of wire stock, e.g., stainless steel wire. Forming flexible spine 110 and each of support members 140 from a single piece of wire stock decreases the complexity and cost of manufacture as well as the ease of installation of cable support apparatus 100, as will become more apparent below.

Continuing with reference to FIGS. 1-2, support members 140 cooperate with one another to define a longitudinal passageway 142 extending along the length of flexible spine 110. More specifically, each support member 140 includes a body segment 146 configured to engaged flexible spine 110 and first and second arms 160, 170, respectively, extending therefrom to define longitudinal passageway 142 extending therethrough. Longitudinal passageway 142, as will be described in greater detail below, is configured to retain one or more cables "C" therein.

With continued reference to FIGS. 1-2, flexible spine 110 of cable support apparatus 100 is sufficiently strong, e.g., flexible spine 110 has a sufficiently large diameter, to retain its shape despite typical forces, stresses and vibrations acting thereon. However, flexible spine 110 is also sufficiently pliable such that a user may bend and/or manipulate flexible spine 110 in any direction and in numerous positions along the length thereof without the use of tools or machinery. Rather, in order to form flexible spine 110 to the desired configuration, the user need only grasp flexible spine 110 on opposing sides of the desired bend point and manipulate flexible spine 110 to the desired configuration. The above process can then be repeated at each desired bend point such that flexible spine 110 may be adapted to achieve any desired configuration, including multi-curved, three-dimensional, or other complex shape configurations. Further, additional cable support apparatuses, e.g., cable support apparatus 200, may be coupled to cable support apparatus 100, via a connector 300, in an end-to-end relationship therewith such that cable support system 10 may define a desired length. As can be appreciated, cable support apparatuses 100, 200 may define various lengths such that the user may select any combination of cable support apparatuses 100, 200 to achieve a cable support system having a specific length.

Figure 3A:
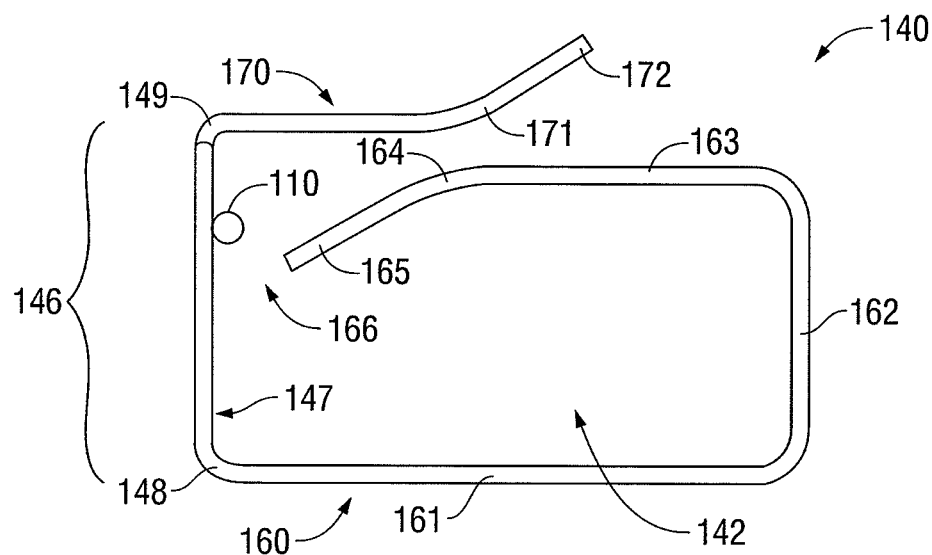
FIG. 3A is a front end view of the cable support apparatus of FIG. 2.
Figure 4A:
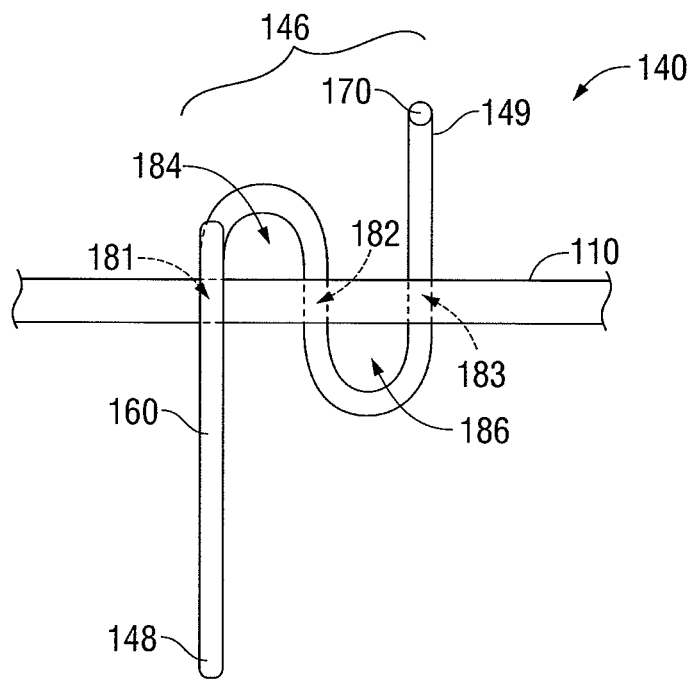
FIG. 4A is a side view of a portion of the cable support apparatus of FIG. 2.
Figure 5A:
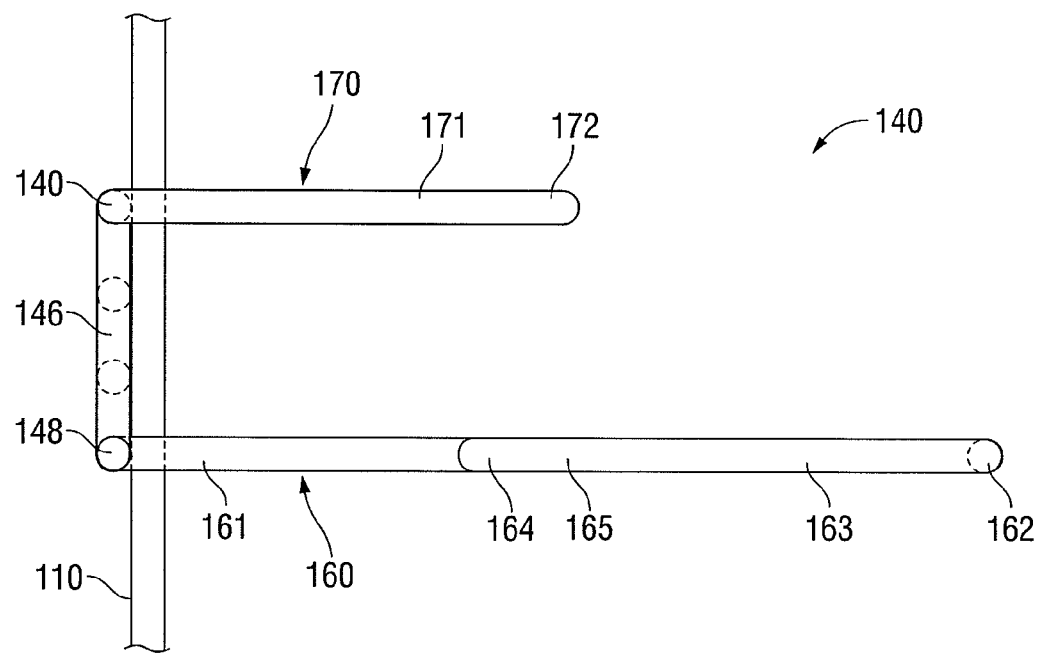
FIG. 5A is a top view of a portion of the cable support apparatus of FIG. 2.

Referring now to FIGS. 3A, 4A and 5A, as mentioned above, each support member 140 includes a body segment 146 that is coupled to flexible spine 110 and first and second arms 160, 170, respectively, extending therefrom. More specifically, flexible spine 110 is engaged to body segment 146 of each support member 140 on an interior side 147 thereof, such that flexible spine 110 is disposed within longitudinal passageway 142 defined by first and second arms 160, 170, respectively. Body segment 146 extends along flexible spine 110 in generally parallel orientation with respect to flexible spine 110, while first and second arms 160, 170, respectively, extend in a similar direction from first and second ends 148, 149, respectively, of body segment 146, in a generally perpendicular direction relative to flexible spine 110 and body segment 146. As such, first and second arms 160, 170, respectively, cooperate with body segment 146 to define a generally rectangular longitudinal passageway 142 extending therethrough, although other configurations are contemplated.

With continued reference to FIGS. 3A, 4A and 5A, first end 148 of body segment 146 is longitudinally-spaced from second end 149 of body segment 146 along flexible spine 110. Further, first end 148 of body segment 146 extends downwardly from flexible spine 110, while second end 149 of body segment 146 extends upwardly from flexible spine 110 (although first and second ends 148, 149 of body segment 146 may extend in any set of opposed directions relative to flexible spine 110). Accordingly, first arm 160 extends from and is initially disposed below flexible spine 110, while second arm 170 extends from and is disposed above flexible spine 110.

As best shown in FIG. 3A, first arm 160 of support member 140 defines a generally rectangular-shaped configuration. More specifically, first arm 160 includes a base portion 161, a side wall portion 162 and a top portion 163 having a free end 164. Base portion 161 and side wall portion 162, and side wall portion 162 and top portion 163 are bent approximately 90 degrees relative to one another to define the rectangular configuration of first arm 160. Further, due to this rectangular configuration, free end 164 of first arm 160 extends back toward flexible spine 110. However, it is also envisioned that first arm 160 define various other shape configurations, depending on the type and/or quantity of cables "C" (FIG. 1) to be retained therein.

With continued reference to FIG. 3A, first arm 160 includes a finger 165 disposed on free end 164 thereof and extending therefrom. Finger 165 is angled downwardly relative to top portion 162 of first arm 160 toward base portion 161 thereof, e.g., into longitudinal passageway 142, and is spaced-apart from body segment 146 of support member 140 to define an opening 166 therebetween. As will be described in greater detail below, opening 166 is configured to permit positioning of one or more cables "C" (FIG. 1) within longitudinal passageway 142.

Second arm 170, as best shown in FIG. 3A, extends from second end 149 of body segment 146 a relatively small distance above, or co-planar with top portion 163 of first arm 160. More specifically, second arm 170 extends from body segment 146 beyond opening 166 defined between finger 165 of first arm 160 and body segment 146. Second arm 170 similarly includes a finger 172 disposed at a free end 171 thereof. Finger 172 is deflected upwardly relative to second arm 170 in a substantially opposite direction relative to the deflection of finger 165 of first arm 160.

As can be appreciated, due to the configuration of first and second arms 160, 170, respectively, of support member 140, cables "C" (FIG. 1) must be manipulated in multiple directions and/or in multiple positions to be positioned within longitudinal passageway 142. Such a configuration helps maintain cables "C" (FIG. 1) within longitudinal passageway 142 despite typical stresses and/or forces acting on cable support apparatus 100 or cables "C" (FIG. 1). The deflected fingers 165, 172, of first and second arms 160, 170, respectively, also facilitate positioning of cables "C" (FIG. 1) within longitudinal passageway 142 by guiding cables "C" (FIG. 1) between first and second arms 160, 170, respectively, and between first arm 160 and body segment 146. Further, top portion 163 of first arm 160 may be bent downwardly and/or second arm 170 may bent upwardly to permit positioning of relative large-diametered cables "C"(FIG. 1) or bundles of cables "C" (FIG. 1) within longitudinal passageway 142. In such an embodiment, first and second arms 160, 170, respectively, may be configured to be resiliently bendable, or may be configured to retain their bent shape upon bending.

Turning now to FIGS. 4A and 5A, body segment 146 of support member 140 is shown engaged to flexible spine 110. More particularly, body segment 146 of support member 140 is welded to flexible spine 110 at each intersection point 181, 183, 183 between body segment 146 and flexible spine 110. Thus, as shown in FIG. 4A, wherein body segment 146 defines a multi-curved, or sine-wave-shaped configuration, body segment 146 of support member 140 is welded to flexible spine 110 at the three intersection points 181, 182, 183 between body segment 146 and flexible spine 110. Further, the multi-curved configuration of body segment 146 creates two attachment apertures 184, 186 between body segment 146 and flexible spine 110: a first attachment aperture 184 defined below body segment 146 and above flexible spine 110 between first and second intersection points 181, 182, respectively, thereof and a second attachment aperture 186 defined below flexible spine 110 and above body segment 146 between second and third intersection points 182, 183, respectively, thereof. In other words, flexible spine 110 bisects the multi-curved body segment 146 of support member 140, to define the first and second attachment apertures 184, 186, respectively, therebetween. However, it is envisioned that body segment 146 may define various other configurations and/or that greater than two attachment apertures 184, 186 be defined between body segment 146 of support member 140 and flexible spine 110.

As can be appreciated, the above-described multi-curved configuration of body segment 146, which is bisected by flexible spine 110 and is welded thereto at the intersection points 181, 182, 183 therebetween, allows for a simplified manufacturing process, thereby reducing the manufacturing costs of cable support apparatus 100. More specifically, cable support apparatus 100 includes only two different components, flexible spine 110 and a plurality of identical support members 140 (although support members 140 may be configured to have different configurations, if desired), each of which is formed from a single piece of wire stock. The support members 140 are then welded to the flexible spine 110, e.g., at the three intersection points 181, 182, 183 between body segment 146 of support member 140 and flexible spine 110, at pre-defined intervals along the length thereof.

Figure 3B:
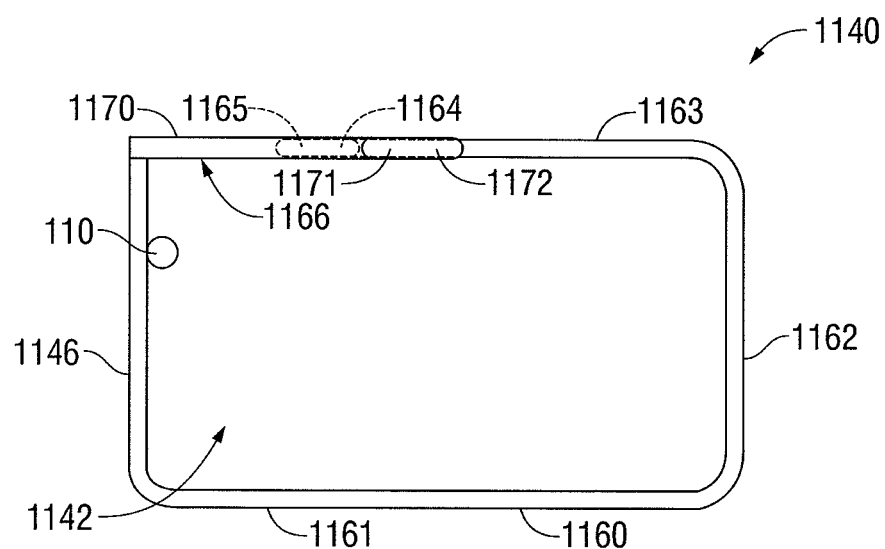
FIG. 3B is a front end view of another embodiment of a cable support apparatus similar to the cable support apparatus of FIG. 2.
Figure 4B:
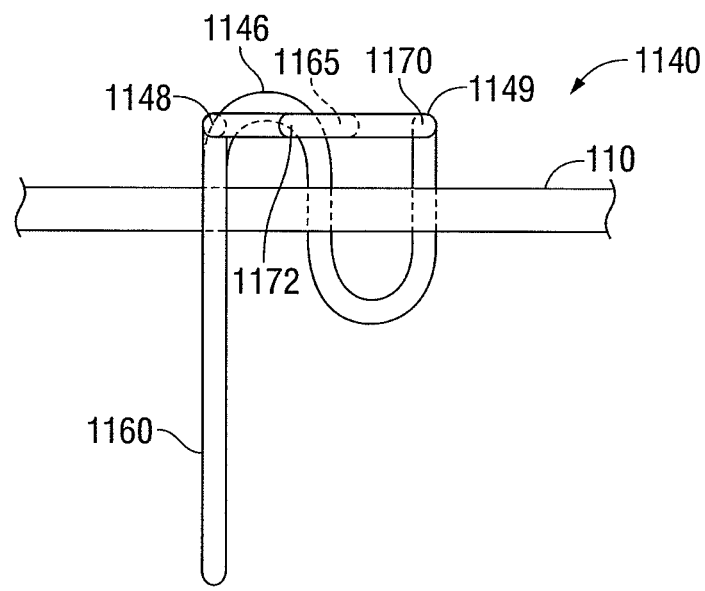
FIG. 4B is a side view of a portion of the cable support apparatus of FIG. 3B.
Figure 5B:
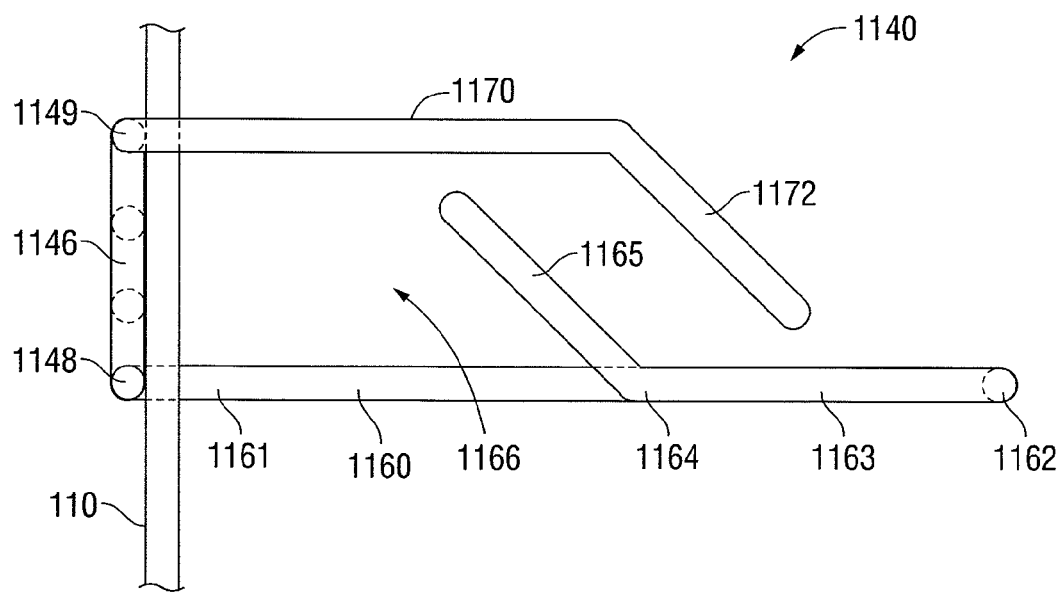
FIG. 5B is a top view of a portion of the cable support apparatus of FIG. 3B.

Referring now to FIGS. 3B, 4B and 5B, another embodiment of a support member, support member 1140, configured for use with cable support system 10 is shown. Support member 1140 is similar to support member 140 (FIGS. 3A, 4A and 5A), described above and, thus, the following description of support member 1140 will substantially focus on only the differences between support member 1140 and support member 140 (FIGS. 3A, 4A and 5A), for purposes of brevity.

Support member 1140 generally includes a body segment 1146 that is configured to engage flexible spine 110 and first and second arms 1160, 1170, respectively, extending therefrom. First and second arms 1160, 1170, respectively, extend in a similar direction from first and second ends 1148, 1149, respectively, of body segment 1146, in a generally perpendicular direction relative to body segment 1146. In other words, first and second arms 1160, 1170, respectively, cooperate with body segment 1146 to define a generally rectangular longitudinal passageway 1142 extending therethrough.

Continuing with reference to FIGS. 3B, 4B and 5B, first arm 1160 of support member 1140 defines a generally rectangular-shaped configuration. More specifically, first arm 1160 includes a base portion 1161, a side wall portion 1162 and a top portion 1163 having a free end 1164. Base portion 1161 and side wall portion 1162, and side wall portion 1162 and top portion 1163 are bent approximately 90 degrees relative to one another to define the rectangular configuration of first arm 1160.

With continued reference to FIGS. 3B, 4B and 5B, first arm 1160 further includes a finger 1165 disposed on free end 1164 thereof and extending therefrom. Finger 1165 is angled laterally relative to top portion 1162 of first arm 1160 toward second arm 1170 and is spaced-apart from body segment 1146 of support member 1140 to define an opening 1166 therebetween.

Second arm 1170, as best shown in FIG. 3B, extends from second end 1149 of body segment 1146 co-planarly with top portion 1163 of first arm 1160. More specifically, second arm 1170 extends from body segment 1146 beyond opening 1166 defined between finger 1165 of first arm 1160 and body segment 1146. Second arm 1170 similarly includes a finger 1172 disposed at a free end 1171 thereof. Finger 1172 is deflected laterally relative to second arm 1170 toward first arm 1160 in a substantially opposite direction relative to the deflection of finger 1165 of first arm 1160. As can be appreciated, in this configuration, first and second arms 1160, 1170 including first and second fingers 1165, 1172, respectively, are substantially co-planar with one another.

Similar to support member 140 (see FIGS. 3A, 4A and 5A), the configuration of support member 1140 requires cables "C" (FIG. 1) to be manipulated in multiple directions and/or in multiple positions to be positioned within longitudinal passageway 1142. Such a configuration helps maintain cables "C" (FIG. 1) within longitudinal passageway 1142 despite typical stresses and/or forces acting thereon. Support member 1140 may otherwise be configured similarly to and/or may include any of the other features of support member 140 (FIGS. 3A, 4A and 5A).

Figure 3C:
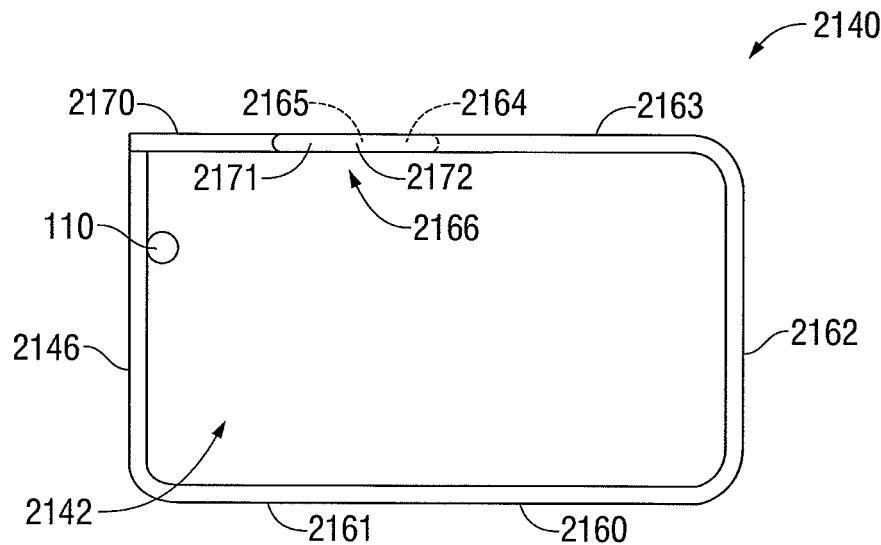
FIG. 3C is a front end view of yet another embodiment of a cable support apparatus similar to the cable support apparatus of FIG. 2.
Figure 4C:
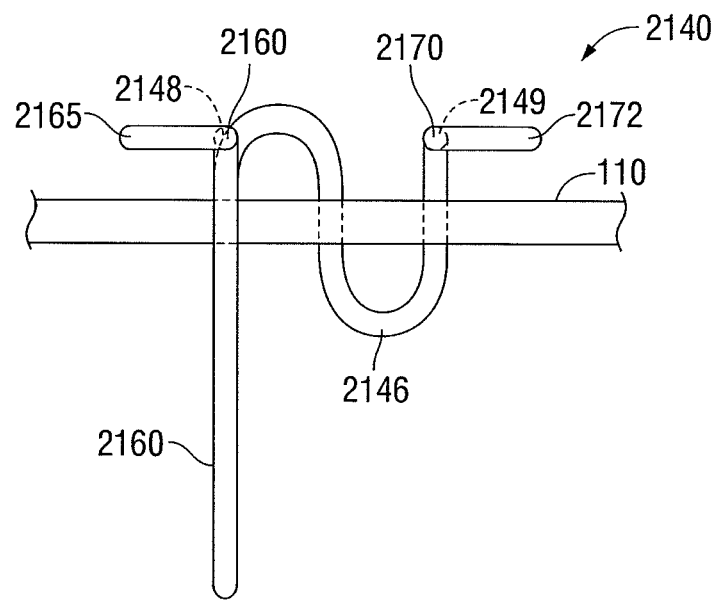
FIG. 4C is a side view of a portion of the cable support apparatus of FIG. 3C.
Figure 5C:
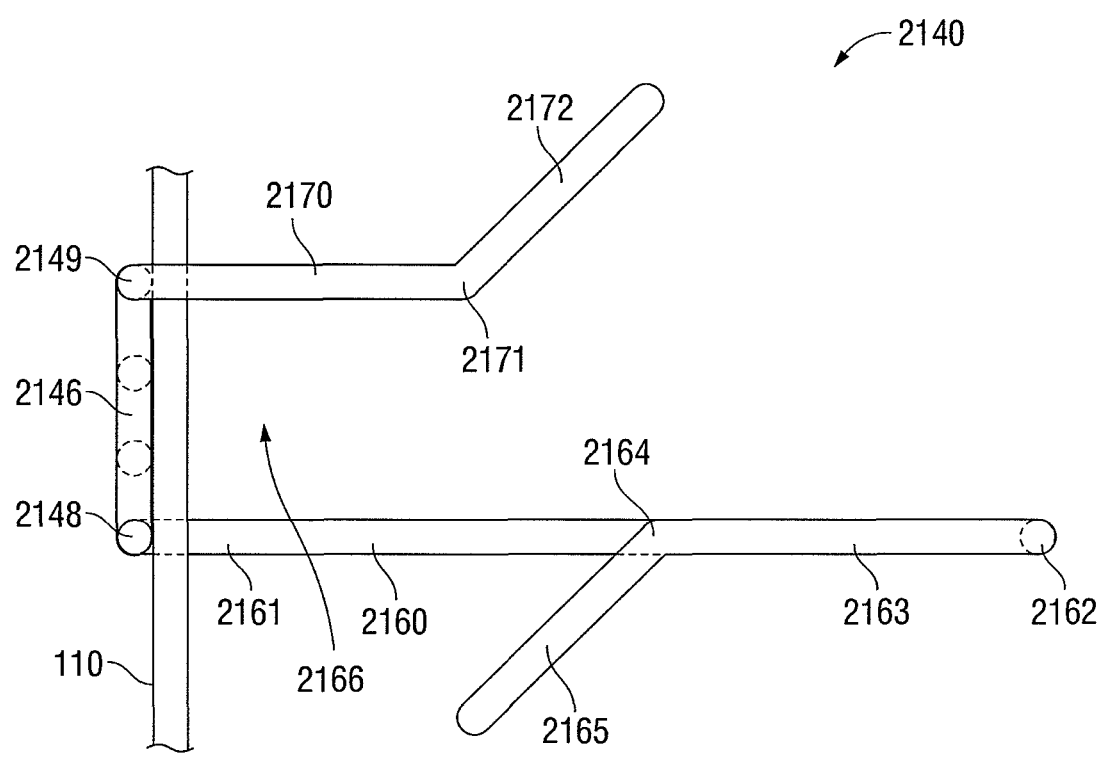
FIG. 5C is a top view of a portion of the cable support apparatus of FIG. 3C.

Referring now to FIGS. 3C, 4C and 5C, yet another embodiment of a support member, support member 2140, configured for use with cable support system 10 is shown. Support member 2140 is similar to support members 140, 1140 (FIGS. 3A, 4A, 5A and FIGS. 3B, 4B, 5B, respectively), described above and, thus, the following description of support member 2140 will focus on the differences between support member 2140 and support members 140, 1140 (FIGS. 3A, 4A, 5A and FIGS. 3B, 4B, 5B, respectively).

Support member 2140 generally includes a body segment 2146 that is configured to engage flexible spine 110 and first and second arms 2160, 2170, respectively, extending therefrom. First and second arms 2160, 2170, respectively, cooperate with body segment 2146 to define a generally rectangular longitudinal passageway 2142 extending therethrough.

Continuing with reference to FIGS. 3C, 4C and 5C, first arm 2160 of support member 2140 defines a generally rectangular-shaped configuration including a base portion 2161, a side wall portion 2162 and a top portion 2163 having a free end 2164. First arm 2160 further includes a finger 2165 disposed on free end 2164 thereof and extending therefrom. Finger 2165 is angled laterally relative to top portion 2162 of first arm 2160 away from second arm 2170 and is spaced-apart from body segment 2146 of support member 2140 to define an opening 2166 therebetween.

Second arm 2170, as best shown in FIG. 3C, extends from second end 2149 of body segment 2146 co-planarly with top portion 2163 of first arm 2160. More specifically, second arm 2170 extends from body segment 2146 beyond opening 2166 defined between finger 2165 of first arm 2160 and body segment 2146. Second arm 2170 similarly includes a finger 2172 disposed at a free end 2171 thereof. Finger 2172 is deflected laterally relative to second arm 2170 away from first arm 2160 in a substantially opposite direction relative to the deflection of finger 2165 of first arm 2160. As can be appreciated, in this configuration, first and second arms 2160, 2170 including first and second fingers 2165, 2172, respectively, are substantially co-planar with one another. Further, first and second finger 2165, 2172, respectively, are generally parallel relative to one another and fully overlap one another, as best shown in FIG. 5C.

Similar to support members 140, 1140 (see FIGS. 3A, 4A, 5A and FIGS. 3B, 4B, 5B, respectively), the configuration of support member 2140 requires cables "C" (FIG. 1) to be manipulated in multiple directions and/or in multiple positions to be positioned within longitudinal passageway 2142 such that, one positioned within longitudinal passageway 2142, cables "C" (FIG. 1) are maintained within longitudinal passageway 2142 despite typical stresses and/or forces acting thereon. Support member 2140 may otherwise be configured similarly to and/or may include any of the other features of support members 140, 1140 (FIGS. 3A, 4A, 5A and FIGS. 3B, 4B, 5B, respectively).

Figure 6:
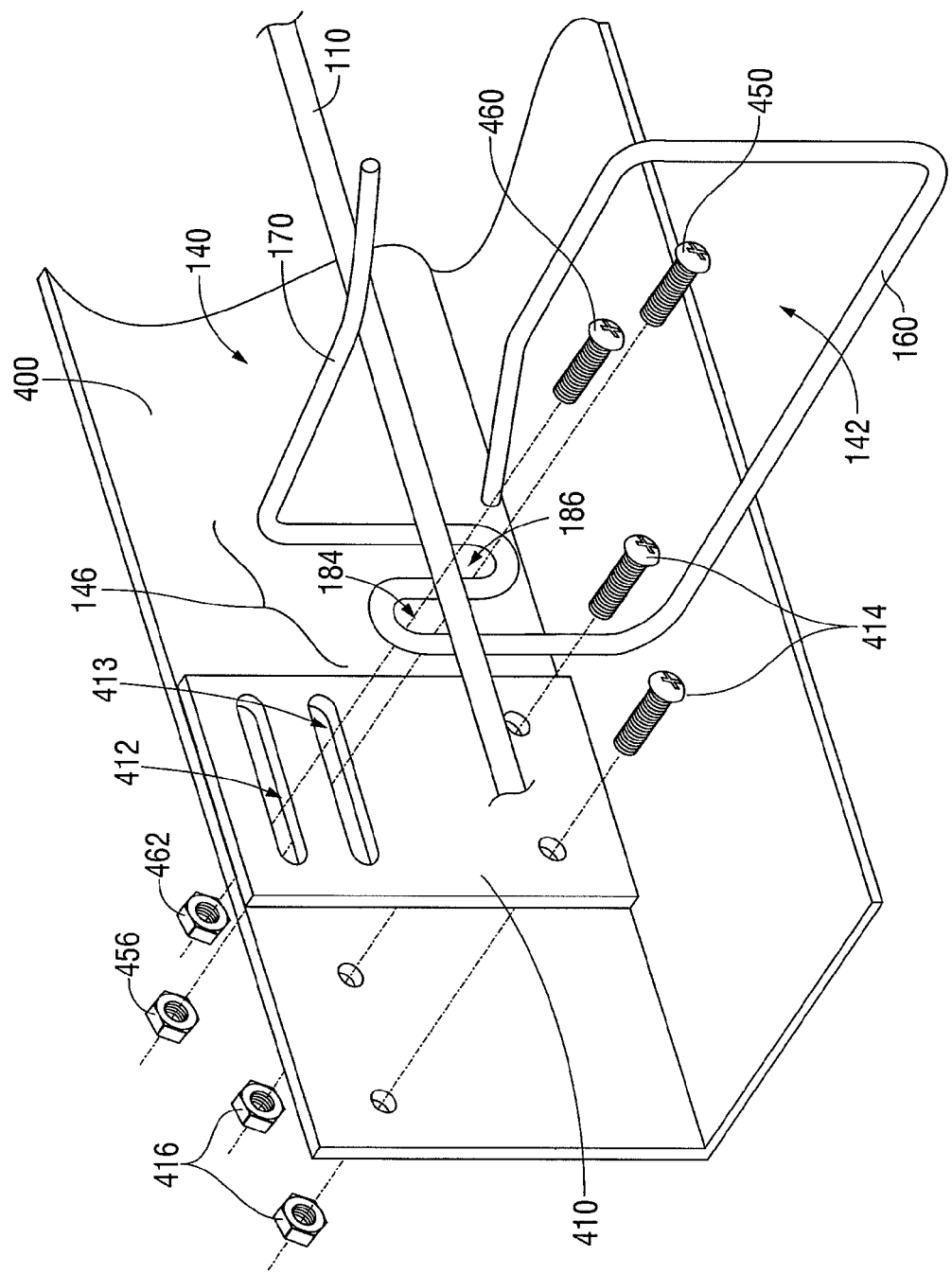
FIG. 6 is an exploded, perspective view illustrating the attachment of the cable support apparatus of FIG. 2 to a mounting frame.
Figure 7:
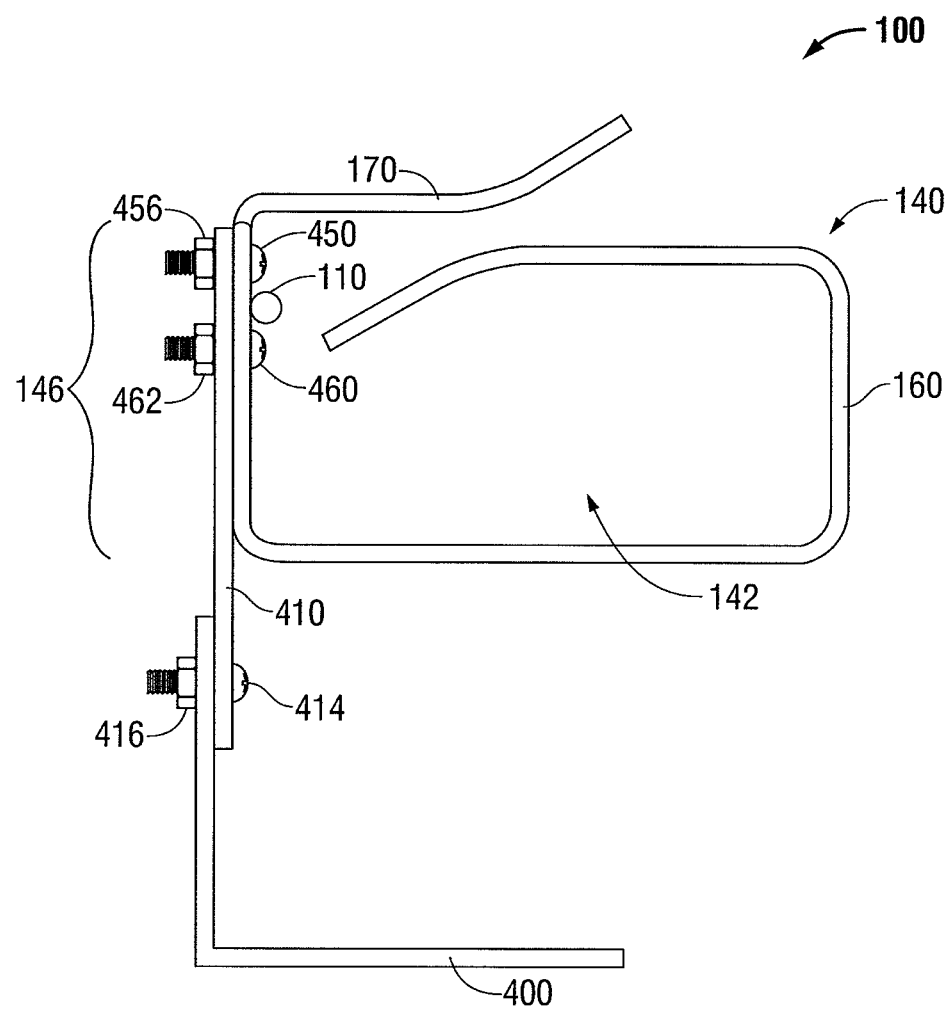
FIG. 7 is a front end view of the cable support apparatus of FIG. 2 shown mounted to the mounting frame.
Figure 8:
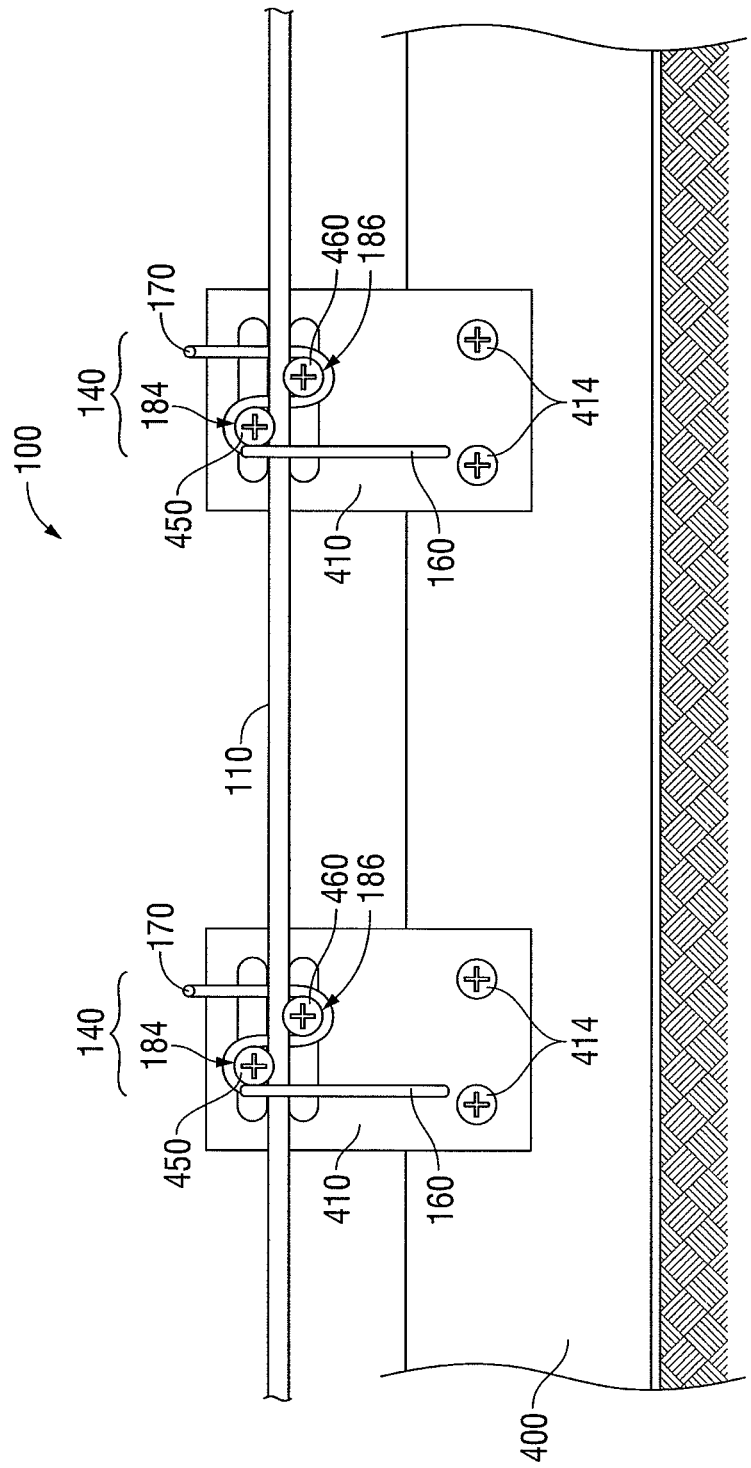
FIG. 8 is a side view of the cable support apparatus of FIG. 2 shown mounted to the mounting frame.

Turning now to FIGS. 6-8, the installation of cable support apparatus 100 to a frame 400 (or other suitable structure) will be described. It is envisioned that cable support apparatus 100 be engaged to frame 400 via any suitable number of engagements. More specifically, each support member 140 may be engaged to frame 400 to increase the strength and stability of cable support apparatus 100, or, alternatively, cable support apparatus 100 may be engaged to frame 400 at every other support member 140, ever third support member, or via only a few support members 140 disposed along the length of cable support apparatus 100. In any of the above-configurations, cable support apparatus 100 is configured to securely engage frame 400 sufficiently to retain the weight of a plurality of cables "C" therein without compromising the engagement between cable support apparatus 100 and frame 400. Further, although only one embodiment of a frame 400 is shown, it is envisioned that cable support apparatus 100 may similarly be engaged to any other suitable structure (not shown).

With continued reference to FIGS. 6-8, attachment plate 410 is initially secured to frame 400 via a pair of securing members, e.g., bolts 414 and corresponding nuts 416. Attachment plate 410 extends upwardly from the "L"-shaped frame 400 and defines a pair of elongated slots 412, 413 extending therethrough for engaging cable support apparatus 100 thereto. However, it is also envisioned that cable support apparatus 100 be directly engaged to frame 400, obviating the need for attachment plate 410.

In order to secure support member 140 to attachment plate 410 of frame 400, a first securing member, e.g., bolt 450 is inserted through attachment apertures 184 defined between body segment 146 of support member 140 and flexible spine 110, and through elongated slot 412 of attachment plate 410. A washer (not shown) may be positioned about bolt 450 toward the head of bolt 450 to inhibit bolt 450 from passing completely through attachment aperture 184. Next, a nut 456 is secured on the shank end of bolt 450 to securely retain attachment plate 410 and support member 140 between bolt 450 and nut 456, thereby securely engaging cable support apparatus 100 to frame 400. A second securing member, e.g., bolt 460 and nut 462 may similarly be installed through second attachment aperture 186 and second elongated slot 413 to further secure cable support apparatus 100 to frame 400.

As shown in FIGS. 6-8, the engagement between body segment 146 of support member 140 and attachment plate 410 of frame 400 at two positions offset from one another, e.g., through first attachment aperture 184 and first elongated slot 412 via nut and bolt 456, 450, respectively, and second attachment aperture 186 and second elongated slot 413 via nut and bolt 462, 460, respectively, inhibits cable support apparatus 100 from rotating and twisting relative to frame. Further, such a configuration allows cable support apparatus 100 to be secured to frame 400 at various positions, thus allowing flexible spine 110 to be bent in various configurations, while remaining securely engaged to frame 400. Put more generally, the offset attachment apertures 184, 186 allow for greater adaptability and flexibility in the use and positioning of cable support apparatus 100.

Figure 9A:
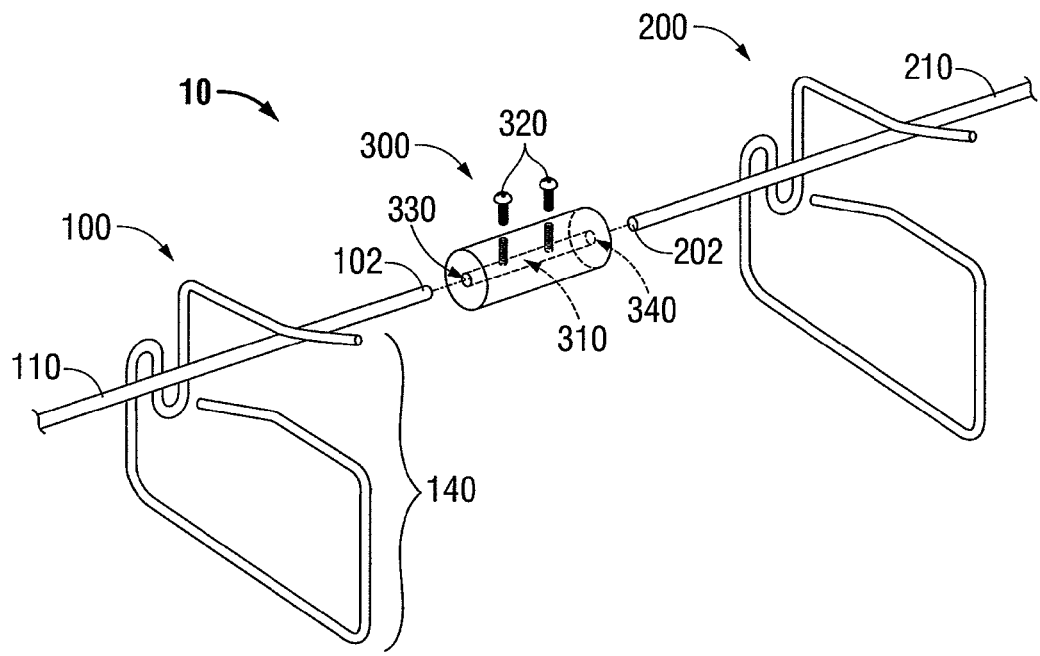
FIG. 9A is an exploded, side view of a connector configured for engaging first and second cable support apparatuses of the cable support system of FIG. 1.
Figure 9B:
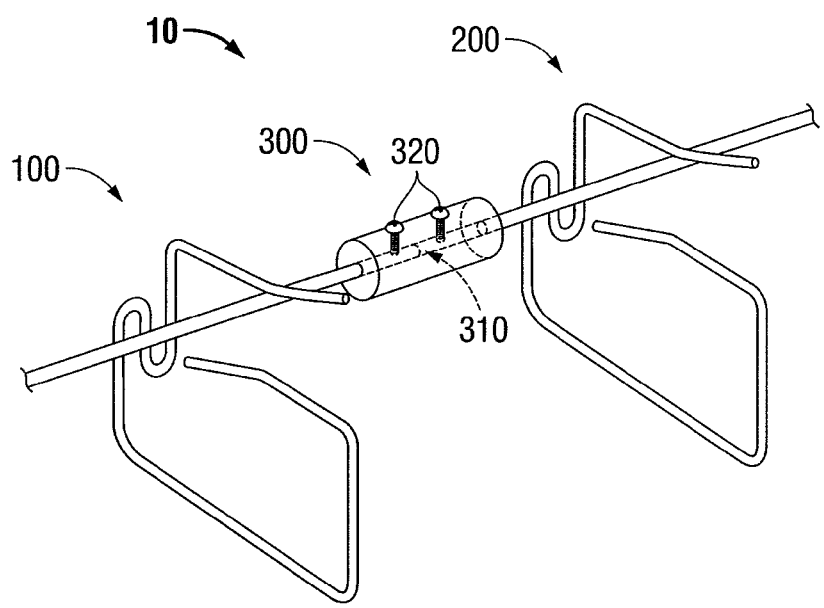
FIG. 9B is a side view showing the first and second cable support apparatuses engaged to one another via the connector.

Turning now to FIGS. 9A-9B, connector 300 is configured for securing two cable support apparatuses, e.g., cable support apparatuses 100, 200, to one another in an end-to-end relationship. More specifically, connector 300 defines a sleeve-like configuration including a lumen 310 extending therethrough. A pair of tightening screws 320 are engaged within connector 300 and extend into lumen 310. Tightening screws 320 may be advanced (or retracted) relative to connector 300 to extending further into (or be retracted from) lumen 310.

With continued reference to FIGS. 9A and 9B, in order to couple first and second cable support apparatuses 100, 200, respectively, to one another, a first end 102 of flexible spine 110 of cable support apparatus 100 is inserted into a first end 330 of lumen 310 of connector 300, while a second end 202 of flexible spine 110 of cable support apparatus 200 is inserted into a second end 340 of lumen 310 of connector 300. Once first and second ends 102, 202 of flexible spines 110, 210 of cable support apparatuses 100, 200, respectively, are positioned within lumen 310 of connector 300, tightening screws 320 are tightened to securely engage flexible spines 110, 210 within lumen 310. In other words, tightening screws 320 are advanced into lumen 310 such that first and second ends 102, 202 of flexible spines 110, 210, respectively, are securely retained between tightening screws 320 and the interior surface of lumen 310. As can be appreciated, such a configuration permits efficient and secure coupling of multiple cable support apparatuses 100, 200 to one another.

Figure 10:
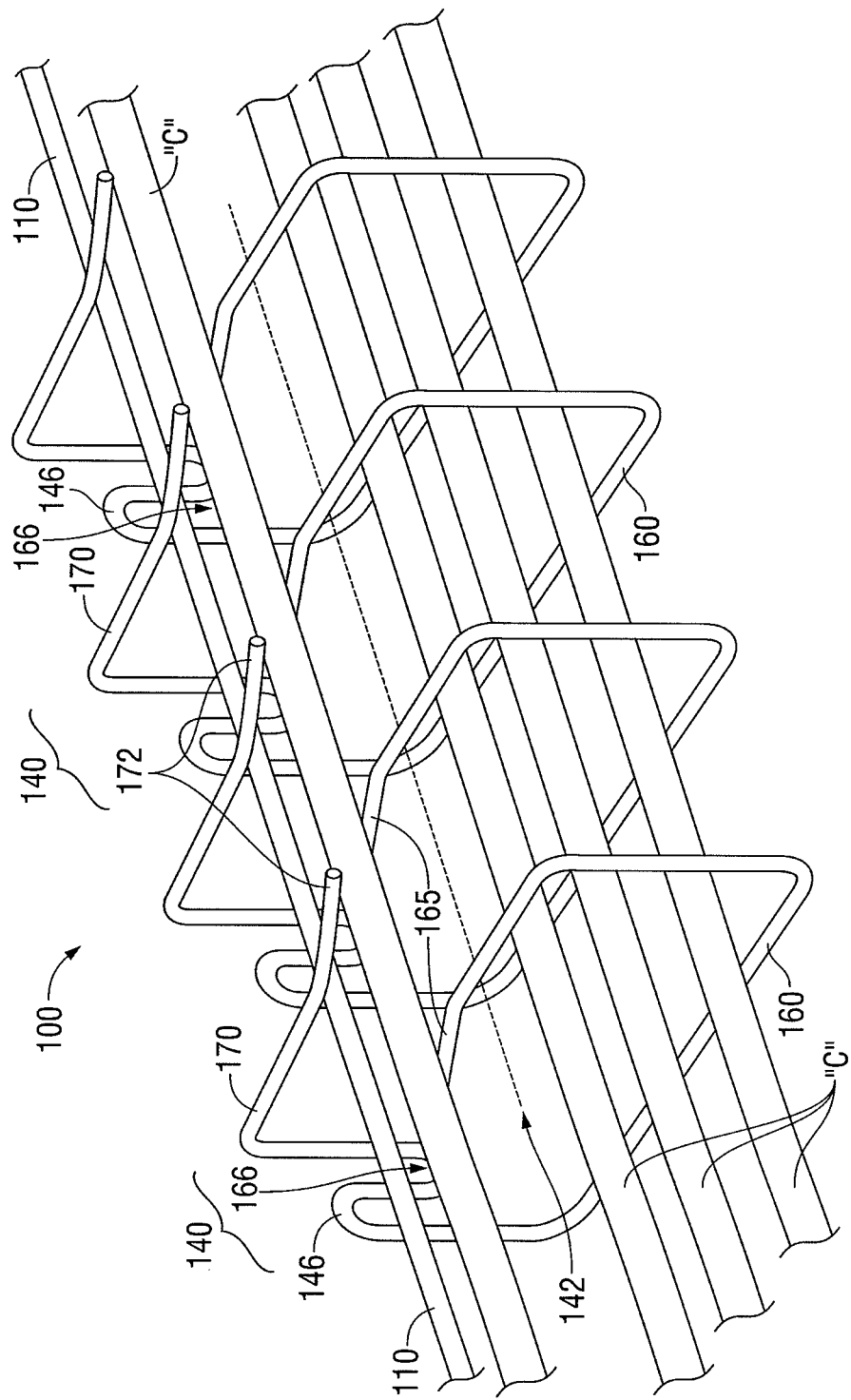
FIG. 10 is an enlarged, perspective view of the cable support apparatus of FIG. 2 showing a plurality of cables being positioned therein.

Referring now to FIG. 10, the positioning of cables "C" within longitudinal passageway 142 will be described. As mentioned above, in order to position cables "C" within longitudinal passageway 142 cables "C" must be manipulated between first and second arms 160, 170, respectively, of each support member 140 and through opening 166 defined between first finger 165 of first arm 160 of support member 140 and body segment 146 of support member 140. More specifically, cable(s) "C" are initially positioned such that a portion of each cable "C" is disposed longitudinally between first and second arms 160, 170, respectively, of support member 140. Next, cable(s) "C" is translated toward flexible spine 110, ensuring that cable "C" is both disposed above top portion 163 of first arm 160 and below second arm 170. Cable "C" is translated toward flexible spine 110 until cable "C" is positioned adjacent and above opening 166. Thereafter, cable "C" is translated downwardly through opening 166, e.g., between body segment 146 of support member 140 and first finger 165 of first arm 160, and into longitudinal passageway 142. The above-described process may then be repeated at each successive support member 140 to fully secure cable(s) within longitudinal passageway 142 defined by support members 140.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A cable support apparatus, comprising:
   a flexible spine formed from a single piece of wire stock, the flexible spine defining a longitudinal axis; and
   a plurality of spaced-apart support members extending longitudinally alongside the flexible spine, each support member disposed on the same side of the flexible spine, each support member formed from a single piece of wire stock, the plurality of support members cooperating with one another to define a longitudinal passageway extending longitudinally alongside and in generally parallel orientation relative to the flexible spine for retaining one or more cables therein, each support member including:
- a body segment extending along and engaged to the flexible spine, the body segment including first and second ends longitudinally spaced apart from one another along the flexible spine, the body segment defining a portion of a first side of the longitudinal passageway;
- a first arm extending from the first end of the body segment, the first arm including a base segment extending outwardly from the body segment and defining a portion of a bottom of the longitudinal passageway, a side segment extending from the base segment and defining a portion of a second side of the longitudinal passageway, and a free end segment extending from the side segment back towards the body segment, the first arm defining a first plane disposed in perpendicular orientation relative to the longitudinal axis;
- a second arm including a generally linear segment extending outwardly from the second end of the body segment in the same direction as the base segment of the first arm and longitudinally spaced from the base segment of the first arm, the generally linear segment of the second arm and the free end segment of the first arm cooperating with one another to define a portion of a top of the longitudinal passageway, the second arm defining a second plane disposed in perpendicular orientation relative to the longitudinal axis and parallel orientation relative to the first plane;
- a first finger extending from a free end of the free end segment of the first arm, a third plane located at a connection between the first finger and the free end segment and disposed in a vertically parallel orientation relative to the longitudinal axis; and
- a second finger extending from a free end of the generally linear segment of the second arm, a fourth plane located at a connection between the second finger and the generally linear segment and disposed in a vertically parallel orientation relative to the longitudinal axis, wherein the first finger is deflected relative to the free end segment and extends horizontally beyond the fourth plane in a direction towards the body segment, and wherein the second finger is deflected relative to the generally linear segment and extends horizontally beyond the third plane in a direction away from the body segment.

2. The cable support apparatus according to claim 1, wherein the body segment of each support member is welded to the flexible spine in at least three positions.

3. The cable support apparatus according to claim 1, wherein the body segment of each support member defines a multi-curved configuration, the flexible spine substantially bisecting the body segment and being engaged thereto at each intersection point of the body segment and the flexible spine to define at least two attachment apertures therebetween.

4. The cable support apparatus according to claim 1, wherein the flexible spine is engaged to the body segment of each support member on an interior side thereof, such that the flexible spine is disposed within the longitudinal passageway.

5. The cable support apparatus according to claim 1, wherein the free end of the free end segment of the first arm is spaced-apart relative to the body segment to define an opening therebetween to permit positioning one or more cables within the longitudinal passageway.

6. The cable support apparatus according to claim 5, wherein the free end of the generally linear segment of the second arm extends from the body segment past the free end of the free end segment of the first arm.

7. The cable support apparatus according to claim 6, wherein the first finger is deflected in a first direction and the second finger is deflected in a second, opposite direction to facilitate positioning of one or more cables within the longitudinal passageway.

8. The cable support apparatus according to claim 7, wherein the free end of the first arm, the free end of the second arm, and the first and second fingers are substantially coplanar with one another.

9. A cable support apparatus, comprising:
- a flexible spine formed from a single piece of wire stock and defining a longitudinal axis; and
- a plurality of support members positioned longitudinally along the flexible spine, each support member formed from a single piece of wire stock, the plurality of support members cooperating with one another to define a longitudinal passageway extending along the flexible spine for retaining one or more cables therein, each support member including:
  - a body segment extending longitudinally along and engaged to the flexible spine, the body segment including a first end and a second end longitudinally spaced from the first end;
  - a first arm extending from the first end of the body segment and defining a generally rectangular-shaped configuration, the first arm including a free end extending toward the body segment, the free end of the first arm being spaced-apart relative to the body segment to define an opening therebetween for positioning one or more cables within the longitudinal passageway, the first arm defining a first plane disposed in perpendicular orientation relative to the longitudinal axis;
  - a first finger disposed at the free end of the first arm, the first finger being deflected relative to the free end segment;
  - a second arm defining a generally linear configuration and extending from the second end of the body segment in the same direction as the first arm, the second arm defining a second plane longitudinally-spaced apart from the first plane, disposed in generally parallel orientation relative to the first plane, and disposed in generally perpendicular orientation relative to the longitudinal axis, the second arm including a free end extending away from the flexible spine; and
  - a second finger disposed at the free end of the second arm, the second finger being deflected relative to the second arm, wherein a third plane is located at a connection between the first finger and the free end of the first arm and is disposed in a vertically parallel orientation relative to the longitudinal axis, the second finger extending horizontally beyond the third plane in a direction away from the body segment, and wherein a fourth plane is located at a connection between the second finger and the free end of the second arm and is disposed in a vertically parallel orientation relative to the longitudinal axis, the first finger extending horizontally beyond the fourth plane in a direction towards the body segment.

10. The cable support apparatus according to claim 9, wherein the body segment of each support member is engaged to the flexible spine to define at least two attachment apertures therebetween.

11. The cable support apparatus according to claim 10, wherein the body segment of each support member is welded to the flexible spine in at least three positions to define the at least two attachment apertures.

12. The cable support apparatus according to claim 10, wherein the body segment of each support member defines a multi-curved configuration, the flexible spine substantially bisecting the body segment and being engaged thereto at each intersection point of the body segment and the flexible spine to define the at least two attachment apertures therebetween.

13. The cable support apparatus according to claim 9, wherein the flexible spine is engaged to the body segment of each support member on an interior side thereof, such that the flexible spine is disposed within the longitudinal passageway.

14. The cable support apparatus according to claim 10, wherein at least two of the attachment apertures are offset relative to one another, the at least two offset attachment apertures being disposed on opposite sides of the flexible spine.

15. The cable support apparatus according to claim 9, wherein the first finger is deflected relative to the first arm in a first direction and the second finger is deflected relative to the second arm in a second direction, the first and second directions being one of similar directions and opposite directions.

16. The cable support apparatus according to claim 9, wherein the free end of the first arm, the free end of the second arm, and the first and second fingers are substantially co-planar with one another.

* * * * *